United States Patent [19]
Urbansky

[11] Patent Number: 5,361,263
[45] Date of Patent: Nov. 1, 1994

[54] TRANSMISSION SYSTEM FOR THE SYNCHRONOUS DIGITAL HIERARCHY

[75] Inventor: Ralph Urbansky, Schwaig, Germany

[73] Assignee: U.S. Philips Corporation, New York, N.Y.

[21] Appl. No.: 148,016

[22] Filed: Nov. 5, 1993

Related U.S. Application Data

[63] Continuation of Ser. No. 848,613, Mar. 9, 1992, abandoned.

[30] Foreign Application Priority Data

Mar. 15, 1991 [DE] Germany ................. 4108429

[51] Int. Cl.$^5$ .................. H04J 3/06; H04L 7/04
[52] U.S. Cl. ................... 370/102; 370/108;
    375/112; 375/118; 369/60; 365/189.05
[58] Field of Search ............ 370/58.1, 58.2, 58.3,
    370/60, 79, 82, 83, 84, 94.1, 99, 100.1, 102,
    105.1, 108, 110.1, 111, 112, 94.2, 60.1; 375/111,
    112, 118; 369/60; 365/189.01, 189.04, 189.05

[56] References Cited

U.S. PATENT DOCUMENTS

| | | | |
|---|---|---|---|
| 4,791,652 | 12/1988 | McEachern et al. | 375/112 |
| 4,811,340 | 3/1989 | McEachern et al. | 370/102 |
| 4,891,788 | 1/1990 | Kreifels | 375/118 |
| 4,928,275 | 5/1990 | Moore et al. | 370/102 |
| 5,123,010 | 6/1992 | Pospischil | 370/110.1 |
| 5,131,013 | 7/1992 | Choi | 375/118 |
| 5,157,655 | 10/1992 | Hamlin, Jr. et al. | 370/102 |
| 5,168,494 | 12/1992 | Mueller | 370/84 |

FOREIGN PATENT DOCUMENTS 4018687 1/1991 Germany .
1195899 11/1968 United Kingdom .

OTHER PUBLICATIONS

CCITT Recommendations G707, G708, G709, and G783.
M. Robeldo et al., "Jitter bei der Übertragung plesiochroner Signale in der SDH" PKI Techn. Mitt. Mar. 1989, pp. 31-38.

Primary Examiner—Alpus H. Hsu
Attorney, Agent, or Firm—David R. Treacy

[57] ABSTRACT

A transmission system for the synchronous digital hierarchy, comprising an adaptation circuit for compensating for phase variations of an STM-N signal. The adaptation circuit (8) comprises a buffer (17, 33), a write address generator (16, 35), a read address generator (18, 44), a justification decision circuit (24, 43) and an output circuit (19, 45), for inserting justification locations for at least one container of the STM-N signal. The buffer is provided for writing and reading the container data. The write address generator is provided for generating write addresses for the data to be written and the read address generator is provided for generating read addresses for the data to be read out. The justification decision circuit is used for forming the mean value of the differences of the addresses of the read and write address generators over a specific period of time and for forming a justification signal as a function of the mean value. The output circuit is provided for generating negative or positive justification locations in the container as a function of the justification signal and for generating an output signal on the basis of the data stored in the buffer.

20 Claims, 8 Drawing Sheets

TRANSMISSION SYSTEM FOR THE SYNCHRONOUS DIGITAL HIERARCHY

This is a continuation of application Ser. No. 07/848,613, filed Mar. 9, 1992, now abandoned.

The invention relates to a transmission system for the synchronous digital hierarchy, comprising an adaptation circuit for compensating for phase variations of an STM-N signal.

In such a transmission system for the synchronous digital hierarchy, plesiochronous signals are combined by means of multiplexing and transmitted over an optical transmission path. Two digital signals are called plesiochronous when their bit rates deviate from the nominal value within given tolerance limits. The signals are combined according to a certain pattern and structured in frames an example is the synchronous transport module STM-N, specifically described in the CCITT Recommendations "Recommendation G.707, G.708 and G.709".

The structure of an STM-1 frame is diagrammatically represented in FIG. 1a. The frame comprises 270 columns and 9 rows (270 bytes per row). The rows 1 to 3 and 5 to 9, in the columns 1 to 9 accommodate the so-called Section Overhead (SOH) for control and error detection information signals, the fourth row of columns 1 to 9 accommodates an Administrative Unit referenced AU pointer (AU-P), and the remaining columns and rows accommodate the actual useful information referenced "STM-1-Payload" (P). As shown in FIG. 1b, the STM-1-Payload accommodates, for example, a Virtual Container VC-4 consisting of a Payload and a Path Overhead POH. A container is here to be understood as the basic unit of payload. Such a container may comprise still further containers.

A state-of-the-art multiplexing structure for the STM-N frames is shown in FIG. 2. For example, C-4 data of a payload are inserted into a container at a bit rate of 140 Mbit/s. The addition of the POH renders the container C-4 into a virtual container VC-4. The addition of justification bytes and further bytes renders the virtual container VC-4 into an administrative unit AU-4. The container VC-4 may also be formed by a combination of several containers C-12. Data of a payload are inserted into such a container C-12 at a bit rate of 2 Mbit/s. The addition of a POH renders such a container C-12 into a virtual container VC-12. The virtual container VC-12 becomes a tributary unit TU-12 as a result of the addition of justification bytes and further bytes. These TUs are combined to groups TUG-2 and TUG-3 respectively.

When a synchronous transport module STM-N is transmitted, problems of clock alignment may occur, for example, when a plurality of STM-1 signals are combined to one STM-4 signal, as is described, for example, in the paper entitled "Jitter bei der Übertragung plesiochroner Signale in der SDH" by M. Robledo and R. Urbanski, PKI Techn. Mitt. 3/1989, pp. 31 to 38. As a result of phase wander or slight frequency deviations, the individual clocks of the various STM-1 signals are no longer adapted to each other. A clock alignment is effected by means of a byte justification method. According to this method predetermined positive or negative justification locations are filled with justification bytes. With a positive justification opportunity the payload is omitted from the justification location. This justification location otherwise carries a payload. With a negative justification opportunity a payload is transmitted in the justification location. This justification location otherwise carries no payload.

SUMMARY OF THE INVENTION

It is an object of the invention to provide a transmission system for the synchronous digital hierarchy of the type mentioned in the opening paragraph, comprising a circuit which controls the justification operations.

This object is achieved by means of a transmission system of the type mentioned in the opening paragraph, in that an adaptation circuit for controlling insertion in justification locations comprises for at least one container of the STM-N signal

- a buffer for writing and reading data of the container,
- a write address generator for forming write addresses for the data to be written and a read address generator for forming read addresses for the data to be read out,
- a justification decision circuit for forming the mean value of the differences between the addresses of the write and read address generators over a specific period of time and for forming a justification signal depending on the mean value, and
- an output circuit for forming negative or positive justification locations in the container in dependence on the justification signal and for forming an output signal on the basis of the data stored in at least one buffer.

The transmission system comprises an adaptation circuit by which justification operations are controlled. In this respect the adaptation circuit comprises at least a buffer in which the data of a container can be written and from which data can be read out. When data are written, they are written in the buffer under write addresses generated by a write address generator. A read address generator further supplies read addresses to the buffer. The data stored under the read addresses are then read from the buffer. Whether a justification operation is performed depends on the comparison between the read and write addresses in a justification decision circuit. The difference between a write and a read address is then formed. The resultant difference value is used for forming the mean difference value over a specific period of time. This formation of the mean value may last, for example, a row or frame period or a multiple thereof. When such an arithmetical mean value is formed, each difference value is given the same weight. A justification signal provided for denoting a negative or positive justification location is formed when specific values are exceeded or fallen short of. On the basis of the data stored in the buffer an output circuit produces an output signal which may comprise negative or positive justification locations. If positive justification is to be performed, data are not read out during one clock signal, and if negative justification is to be performed, data are inserted into a justification location which otherwise does not carry a payload.

For the justification operation of a VC-4 container, only a buffer, a write and a read address generator and a justification decision circuit are necessary. For example, if justification operations are to be carried out with VC-12 containers, the adaptation circuit comprises 63 buffers, 63 write and read address generators and 63 justification decision circuits. If a VC-4 container carries only VC-12 containers, their number is 63. The number of buffers, the number of write and read address generators and the number of justification decision circuits thus depends on the number of containers provided for insertion of the justification locations. As regards justification operations with VC-12 containers it should be observed that according to the CCITT Recommendations two consecutive justification operations are to be at least 16 STM-1 frames apart.

In a further embodiment of the invention there is provided that, in the justification decision circuit, after the difference has been formed over the specific period of time used for forming the mean difference value, the difference values are accumulated and, subsequently, the mean value is compared with two predetermined peak values, and in that the justification decision circuit is arranged for producing a negative justification signal if the mean value falls short of the lower peak value and for producing a positive justification signal if the mean value exceeds the upper peak value. Such a justification decision circuit may be formed by at least one processor unit or discrete building blocks. If discrete building blocks are used, the difference is formed in a subtracter, the accumulation of the difference values is performed in an accumulator and the comparison of the mean values with two given peak values is then performed in a comparator. The two peak values are selected so that a clock adaptation may adequately be performed with the justification locations present.

Once the STM-N signals have passed through the transmission system, the justification bytes are to be removed again at the receiver end of the transmission system. Subsequently, the useful bytes are to be distributed uniformly, so that the phase variation of the clock signal allocated to the useful bytes will satisfy the CCITT requirements concerning jitter.

Jitter is understood to mean the deviation of the clock edges from their nominal positions. A buffer and a phase-locked loop on the receive side of the transmission system are necessary for comparing the data. Especially high-frequency spectral portions in the jitter are reduced by the low-pass property of the phase-locked loop. In above embodiment of the justification decision circuit, however, low-frequency spectral portions may occur in the jitter as a result of the infrequent justification operations, which portions cannot be reduced with simple means on the receive side. Consequently, there is provided in a further embodiment of the invention that the justification decision circuit performs not only an accumulation of the difference values but also an accumulation of values of a periodic number sequence or of a random sequence. The periodic number sequence may exhibit, for example, a sawtooth-like variation. As a result of this additional accumulation of values of a periodic number sequence or a random sequence, justification operations reducing the low-frequency spectral portions of the jitter are performed more frequently.

A further reduction of the low-frequency jitter is obtained if the justification decision circuit is arranged for forming a zero difference value when the allocated buffer is half full, for multiplying the negative and positive justification signals by a constant factor and for accumulating at least one multiplied value and a difference value. The number of justification operations is then increased likewise.

Write addresses for the buffer may only be generated if a payload is present in a buffer allocated to a container. An input circuit is selected for this purpose, which is provided for producing a write clock signal on the basis of an input clock signal for at least one write address generator constituted by a write counter which input clock signal is recovered from the STM-N signal, and is provided for forming write clock pulses only if data of the container allocated to the write address generator are present. If justification operations were performed only for a VC-4 container, it is necessary to produce a write clock signal for a write counter. However, if justification operations are performed for VC-12 containers, it is necessary that 63 write clock signals be formed for 63 write counters.

Read addresses for the buffers may only be generated if a payload is to be read from a buffer allocated to a container. This is the task of the output circuit. This circuit is provided for producing a read clock signal on the basis of an output clock signal generated by an oscillator for at least one read address generator formed by a read counter, and for forming read clock pulses only for data of the allocated container which data are provided for reading the buffer allocated to the read address generator.

The output circuit is further provided for generating a read clock signal in the case of a negative justification signal and for interrupting the read clock signal generation in the case of a positive justification signal.

Exemplary embodiments of the invention will be further explained hereinbelow with reference to the drawing Figures.

DESCRIPTION OF THE PREFERRED EMBODIMENT

Figure 1A:
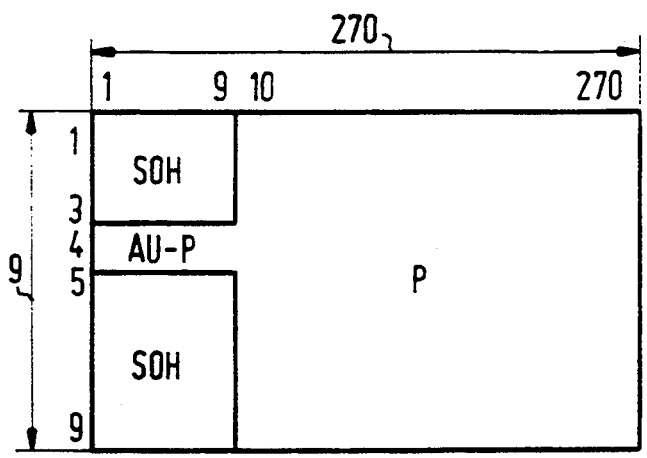
FIGS. 1a and 1b gives a diagrammatic representation of the STM-1 frame comprising a VC-4 container.
Figure 1B:
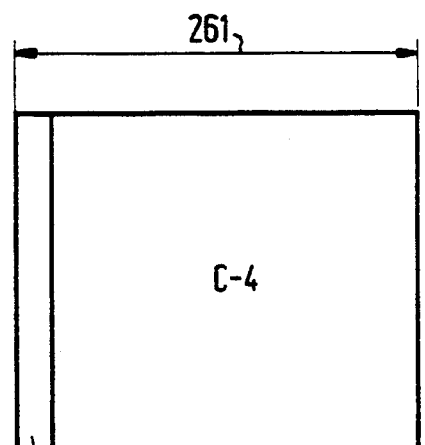
Figure 3:
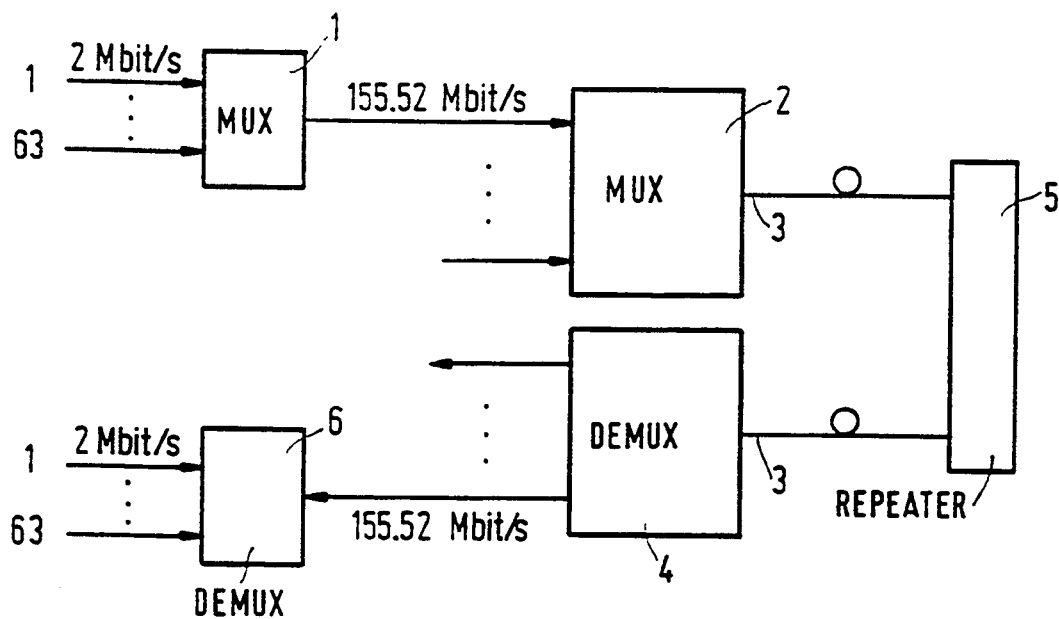
FIG. 3 shows a block diagram of a transmission system for the synchronous digital hierarchy.

The transmission system represented in FIG. 3 for the synchronous digital hierarchy comprises a transmit circuit 1 which combines the 63 2-Mbit/s signals to a 155.52 Mbit/s signal. These signals are then combined to a VC-4 container represented in greater detail in FIG. 1. The transmit circuit 1 thus produces an STM-1 signal. In a circuit 2 a total of four STM-1 signals are combined to an STM-4 signal, which is transported over an optical transmission link 3 to a circuit 4 which forms four STM-1 signals from the STM-4 signal. In the optical transmission link 3 a regenerator circuit 5 is inserted. An STM-1 signal is applied to a receive circuit 6 which produces 63 2-Mbit/s signals from the 155.52 Mbit/s signal (STM-1 signal).

Figure 4:
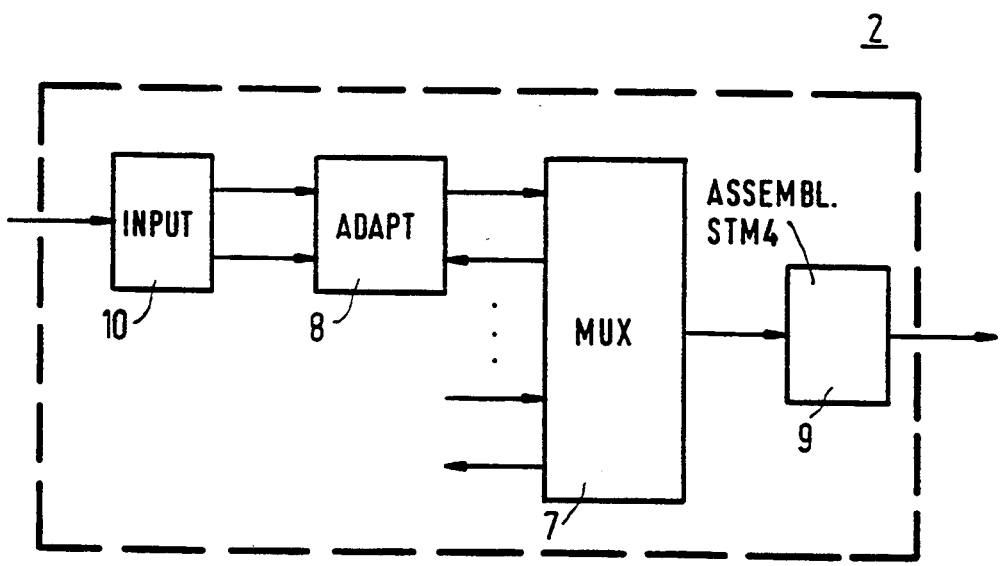
FIG. 4 shows a block diagram of part of the transmission system shown in FIG. 3.

FIG. 4 shows part of the circuit 2. Four STM-1 signals from adaptation circuits 8 are applied to a multiplexer 7. FIG. 4 shows only a single adaptation circuit 8 for simplicity. The adaptation circuit 8 is used for eliminating phase variations and minor frequency deviations which occur between a clock signal derived from the input signal of the adaptation circuit 8 and a clock signal derived from a separate oscillator. The adaptation circuit 8 is supplied with the oscillator clock signal by way of the multiplexer 7. Before the adaptation circuit 8 there is another circuit 10 which is used for clock recovery, error detection and descrambling. The clock recovered from the supplied STM-1 signal is applied to the adaptation circuit 8 over a further line. Once the four STM-1 signals have been combined in the multiplexer 7, they are, in circuit 9, coupled to a clock, scrambled and SOH mapping is effected. As observed in the description of FIG. 1, SOH is understood to mean a Section Overhead. This is part of the STM-1 frame that carries control and error detection information signals.

Figure 5:
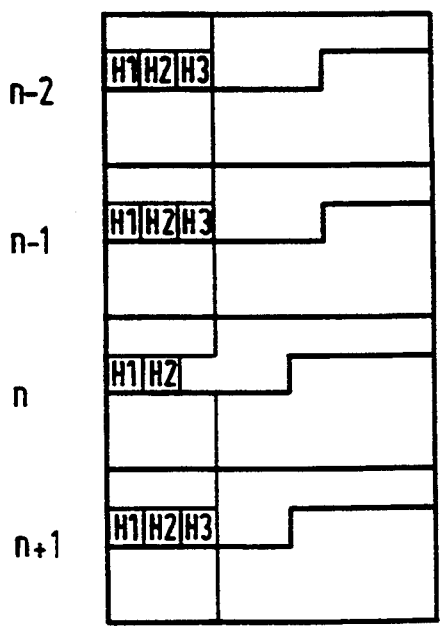
FIG. 5 shows a plurality of STM-1 frames with negative and positive justification opportunities for a VC-4 container.
Figure 5:
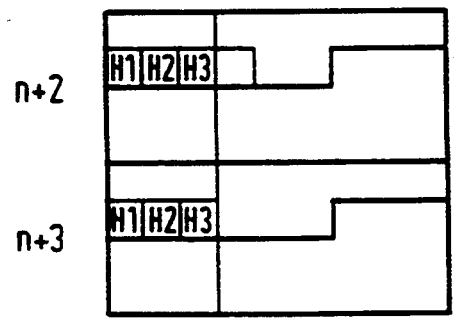
Figure 2:
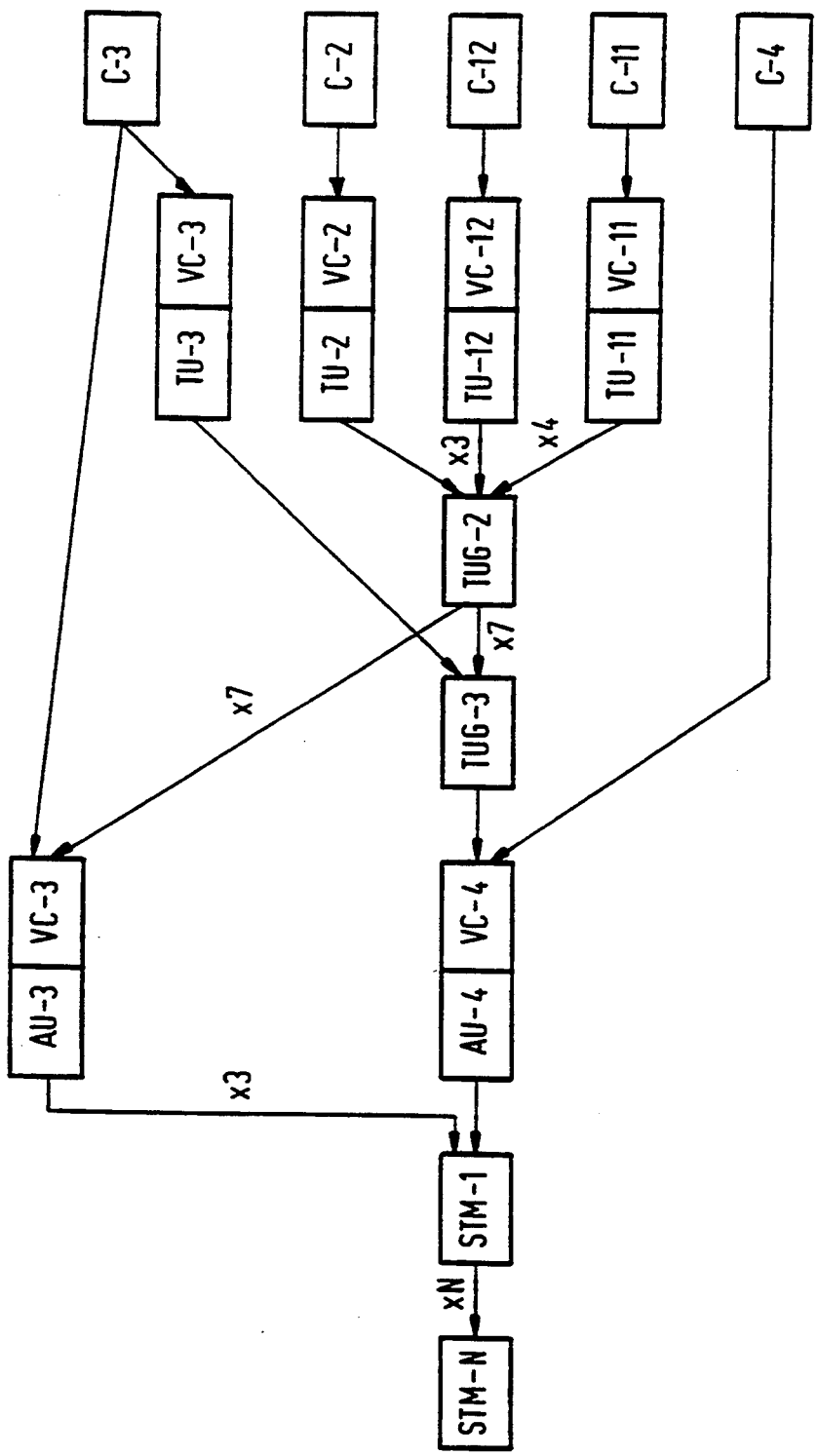
FIG. 2 shows a multiplex structure in the synchronous digital hierarchy.

The adaptation circuit inserts negative or positive justification bytes at predetermined justification locations so as to eliminate the phase variations. Such a justification operation for the STM-1 frame is explained in the following with reference to FIG. 5. In an STM-1 frame, a VC-4 container may commence in the payload area P (STM-1 payload) at a plurality of predetermined locations. The instant when such a VC-4 frame commences is stated in the two first areas H1 and H2 of the administrative unit AU-P. Each VC-4 container commences with a byte referenced J1. If no justification is to take place, the third area H3 of the administrative unit AU-P carries three informationless bytes. This identifies the transition of the two frames n−2 and n−1 in FIG. 5. In the case of a negative justification opportunity, as shown in frame n of FIG. 5, a payload is transmitted in the justification location which otherwise carries three bytes of H3. In the case of a positive justification opportunity, as shown in the frame n+2 in FIG. 5, payload is left out from the three bytes following the area H3.

Figure 6:
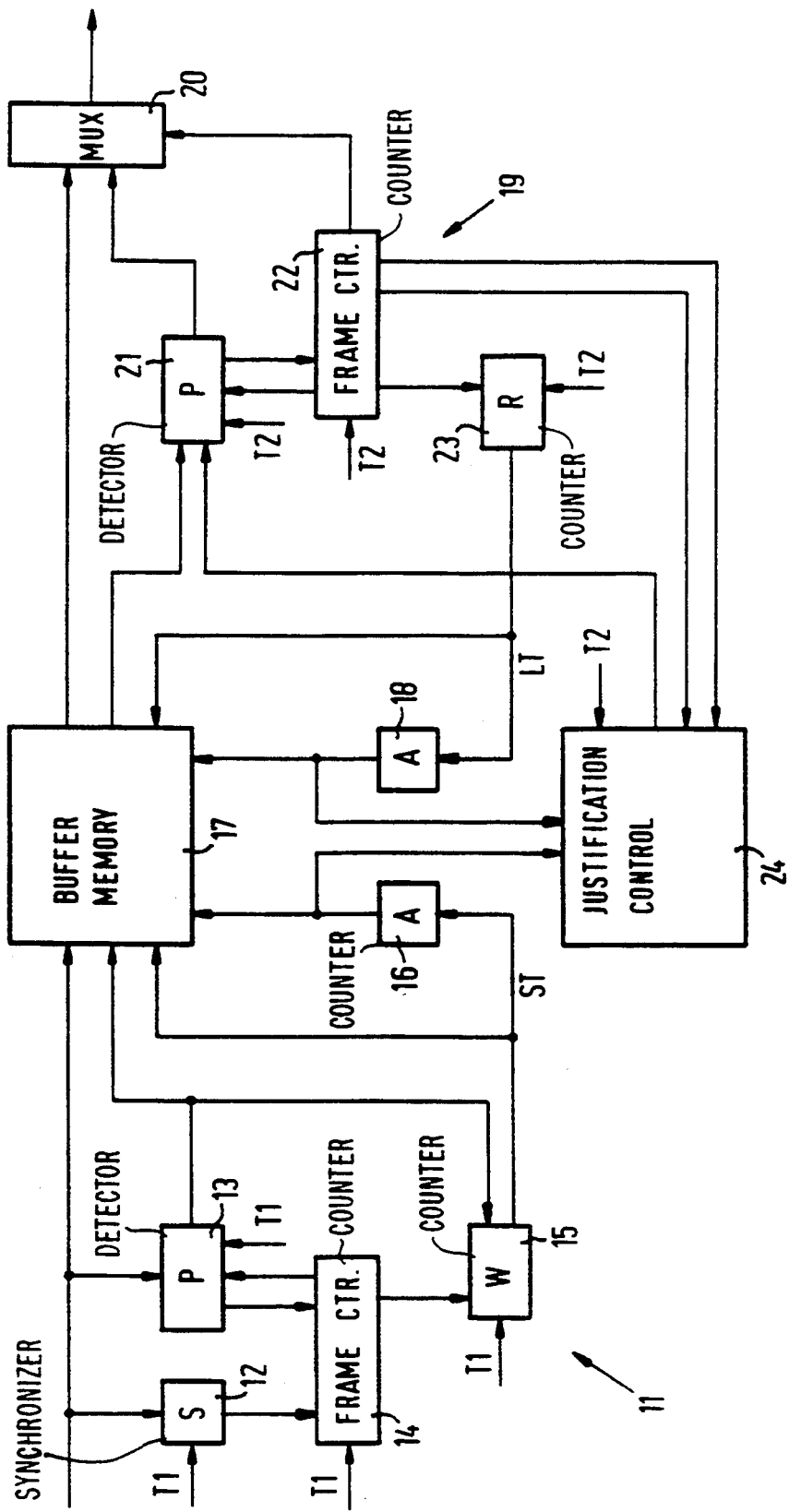
FIG. 6 shows a first exemplary embodiment of an adaptation circuit used in FIG. 4, FIGS. 7 to 9 show justification decision circuits used in FIG. 6, FIGS. 10a to 10d show the structure of the VC-12 containers in a VC-4 container

FIG. 6 shows a first exemplary embodiment for an adaptation circuit 8. An input circuit 11 comprising a first synchronizing circuit 12, a first detection circuit 13, a first frame counter 14 and a second frame counter 15, is supplied with an input clock signal T1 and data of an STM-1 signal. The first synchronizing circuit 12 determines the beginning of an STM-1 frame on the basis of a plurality of bytes found at the head of each STM-1 frame. Once the first synchronizing circuit 12 has recognized the beginning of an STM-1 frame, the first frame counter 14 is set to its starting position. This first frame counter 14 is incremented with each byte of an STM-1 frame. The first frame counter 14 starts and stops the second frame counter 15 which does not produce a write clock signal ST until data of the VC-4 container are present. The first frame counter 14 further controls the first detection circuit 13 to which the bytes in the areas H1 and H2 are applied. The first detection circuit 13 recognizes the beginning of a VC-4 container on account of the contents of the areas H1 and H2 and applies a pulse to the second frame counter 15 at the beginning of such a VC-4 container, which pulse counter 15 then sets its counter to an initial count. The bytes of the areas H1 and H2 also contain the information whether a negative or positive justification location occurs. The first detection circuit 13 passes such information about a negative or positive justification location on to the first frame counter 14 which then causes the second frame counter 15 to start earlier or later. In the case of a negative justification location, the second frame counter 15 is started earlier, because payload is present in the justification location. In the case of a positive justification location the second frame counter 15 is started later.

The second frame counter 15 applies its produced write clock signal ST to a write address generator 16 which consists of a write counter. With each write clock signal ST the write address generator 16 generates a write address under which the associated payload (in the VC-4 container) is written in a buffer 17. The buffer 17 is supplied with the write clock signal ST in addition to the payload of the STM-1 signal. The buffer 17 is also supplied with a marker which identifies the beginning of a VC-4 container and is produced by the first detection circuit 13. This marker is accommodated in the address which identifies the first payload of a VC-4 container.

For reading the data from the buffer 17 it is necessary for the read addresses and a read clock signal LT to be generated. Read addresses are generated by a read address generator 18 which is constituted by a read counter to which the read clock signal LT is applied from an output circuit 19. Payloads are read from the buffer 17 with each read clock signal LT and applied to a multiplexer or change-over switch 20. The output circuit 19 comprises a second detection circuit 21, a third frame counter 22 and a fourth frame counter 23, to which elements an oscillator output clock signal T2 is applied as is described in FIG. 4. The duration of a clock of the output clock signal corresponds, in essence, to the duration of one byte in the STM-1 frame. The third frame counter 22 starts and stops the fourth frame counter 23 which only generates the read clock signal LT when a payload of a VC-4 container is to be read out from the buffer 17. Furthermore, the third frame counter 22 informs the second detection circuit 21 when the areas H1 and H2 in the STM-1 frame occur. The second detection circuit 21 further receives from the buffer 17 the marker which denotes when a VC-4 container commences. The bytes of the areas H1 and H2 are encoded in accordance with this marker.

In addition, there is another justification decision circuit 24 which decides when a negative or positive justification location occurs in the STM-1 frame. This information of the justification decision circuit 24 is applied to the second detection circuit 21. The occurrence of a positive or negative justification location is announced by the second detection circuit 21 to the third frame counter 22 which, on the basis of this information, starts the fourth frame counter 23 earlier or stops same. Furthermore, the third frame counter 22 controls the multiplexer or change-over switch 20 which receives the payload from the buffer 17 and the bytes of the areas H1 and H2 from the second detection circuit 21. In the case of a positive justification location the second detection circuit 21 additionally produces three bytes that do not contain any payload. In the case of a negative justification location payloads from the buffer 17 are delivered three bytes earlier.

The third frame counter 22 additionally generates a frame clock signal and a row clock signal which are applied to the justification decision circuit 24. The duration of a row clock is equal to the duration of a row and the duration of a frame clock is equal to the duration of a frame. The justification decision circuit 24 further receives the justification information from the first detection circuit 13, denoting whether a positive, negative or no justification location is present.

The circuit elements 12 to 15 of the input circuit 11 and the circuit elements 21 to 23 of the output circuit 19 are constituted by processor building blocks which execute a program. In the following a schematically outlined program description is given for each circuit element 12 to 15 and 21 to 23:

First synchronizing circuit 12:
1. Detect the beginning of the STM-1 frame on the basis of data;
2. Set the first frame counter 14 to starting position once the beginning of a frame has been detected;

First frame counter 14:
1. When counter is in starting position, set count to zero;
2. Increment count by unity;
3. If VC-4 data or a negative justification location are present, start second frame counter 15;
4. If no VC-4 data or a positive justification location are present, stop second frame counter 15;
5. Inform the first detection circuit 13 of the beginning of the areas H1 and H2;

First detection circuit 13:
1. If areas H1 and H2 are present, determine their contents;
2. Inform the first frame counter 14 and also the justification decision circuit 24 whether a negative, positive or no justification location is present;
3. Start counting operation until the beginning of the VC-4 container is reached;
4. Once the beginning of the VC-4 container has been reached, send a marker to the buffer 15 and set second frame counter 15 to starting position;

Second frame counter 15:
1. When counter is in the starting position, set count to zero;
2. Once the start of the first frame counter 14 has been released, increment count by unity; otherwise maintain the old count;
3. Produce a clock of the write clock signal ST with each count increment;

Second detection circuit 21:
1. Form the areas H1, H2, H3 and a positive justification location as required on the basis of the marker from the buffer 17 and the justification decision of the justification decision circuit 24;
2. Inform the third frame counter 22 of the justification information and deliver the marker to the third frame counter 22;

Third frame counter 22:
1. Set the count to zero at the beginning of an STM-1 frame;
2. Increment count by unity;
3. Set the fourth frame counter 23 to starting position when a marker occurs;
4. When VC-4 data or a negative justification location are present, start the second frame counter 15;
5. If no VC-4 data or a positive justification location are present, stop the second frame counter 15;
6. Announce the beginning of the areas H1 and H2 to the second detection circuit;
7. Connect the output of buffer store 17 to the output of the multiplexer or change-over switch 20 when VC-4 data are present; Connect the output of the second detection circuit 21 to the output of the multiplexer or change-over switch 20 when areas H1, H2 and H3 and a positive justification location are present;
8. Generate the clock signals and a stop signal for the justification decision circuit 24;

Fourth frame counter 23:
1. When counter is in starting position, set count to zero;
2. Once the start of the third frame counter 22 has been released, increment count by unity; otherwise maintain old count;
3. Produce one clock of the read clock signal LT with each count increment.

Figure 7:
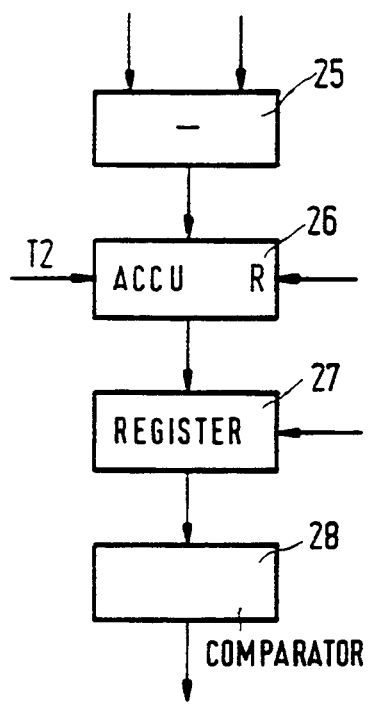

In the following a first exemplary embodiment of a justification decision circuit 24 will be explained with reference to FIG. 7. The write addresses of the write address generator 16 and the read addresses of the read address generator 18 are applied to a subtracter 25 which forms a difference value. When the buffer 17 is half full, the difference value produced by the subtracter 25 equals zero. In the accumulator 26 following in the circuit the difference values are accumulated over a specific period of time. This period of time amounts to one row. After one row the accumulator 26 is reset to zero. This reset is effected by means of a row clock signal produced by the third frame counter 22 shown in FIG. 6. The duration of a row clock signal is equal to the duration of one row. The third frame counter 22 furthermore produces a frame clock signal. The duration of a frame clock of the frame clock signal is equal to the duration of an STM-1 frame. The result of the accumulation of one row is adopted by a register 27 at the end of a frame. This register is supplied with the frame clock signal. The time needed for forming a mean value is equal to the duration of one row. Only the last row of the frame is necessary for forming the mean value. The mean value is adopted by the register 27 at the end of a frame. In the comparator 28 following in the circuit the result stored in the register 27 is compared with a lower and an upper peak value. If the lower peak value is fallen short of, a negative justification signal is generated and if the upper peak value is exceeded, a positive justification signal is generated. The two peak values are selected in such a way that with the possible phase variations and the justification locations present a sufficient adaptation of the signal to the read clock signal may be effected (cf. CCITT Recommendation G.783).

Figure 8:
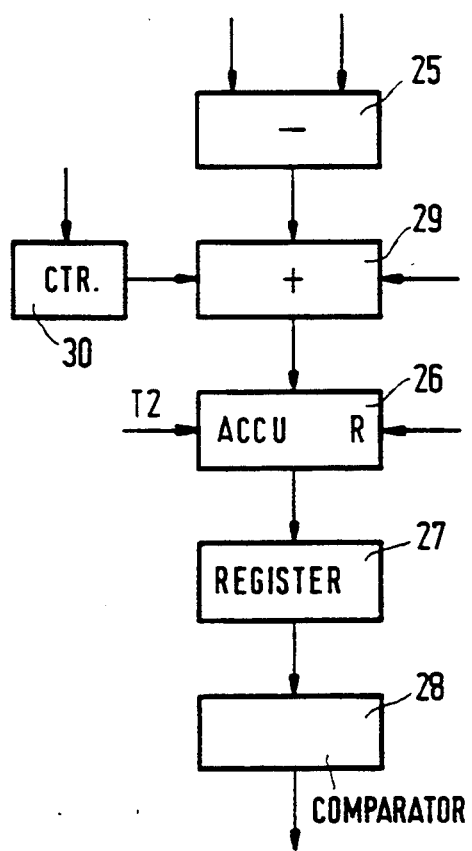

A further embodiment of a justification decision circuit is shown in FIG. 8. It also comprises a subtracter 25 which receives the write addresses from the write address generator 16 and the read addresses from the read address generator 18. The output values or difference values of the subtracter 25 are applied to an adder 29. This adder also receives values from a counter 30 which is clocked with a frame clock signal. In this manner a sawtooth-shaped variation of the output values of the counter 30 will arise after a number of frame clocks. The output values of the adder 29 are applied to the accumulator 26 which accumulates over one row. The accumulation result is stored in the register 27 at the end of a frame by means of a frame clock signal. In the subsequent comparator 28 a decision is then made, as is done in the justification decision circuit described with respect to FIG. 7, whether a negative or positive justification signal is generated.

Figure 9:
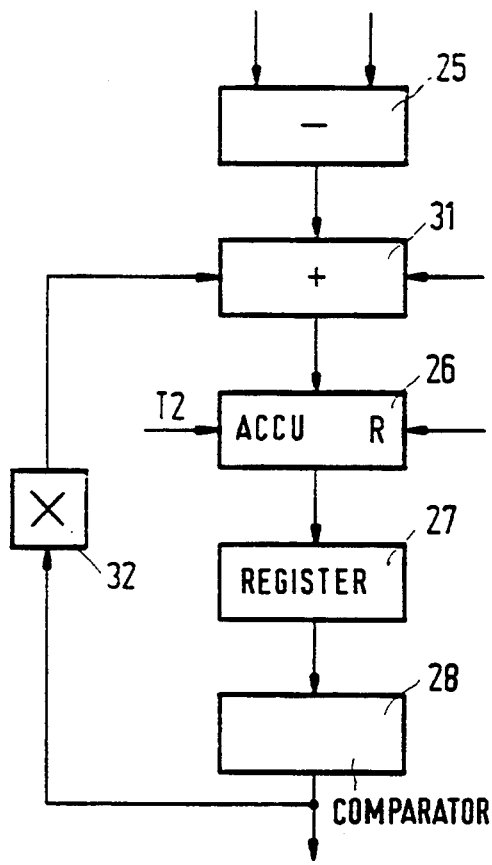

A third embodiment for a justification decision circuit 24 is shown in FIG. 9. The subtracter 25 is supplied with the read addresses and the write addresses. The difference values are applied to an adder 21 which adds each difference value to an output value coming from a multiplier 32. In the multiplier 32 the negative or positive justification signal, whichever is produced by the comparator 28, is multiplied by a constant factor. The factor causes a stabilization of the adaptation circuit 8 and the factor is to be chosen such that once the justification operation has ended, caused by a justification signal, the output value of the adder 31 is changed relative to the difference value at the subtracter 25 by a factor of one or two. Subsequently, an accumulation is effected in the accumulator 26 and this result is stored in the register 27 in similar fashion to the two justification decision circuits 24 shown in FIGS. 7 and 8. The justification decision circuits 24 shown in FIGS. 8 and 9 have fewer low-frequency spectral components in the jitter of the clock frequency as compared with the justification decision circuit 24 shown in FIG. 7, which clock frequency occurs in a receive circuit 6 (FIG. 3) for recovering useful information.

Figure 10A:
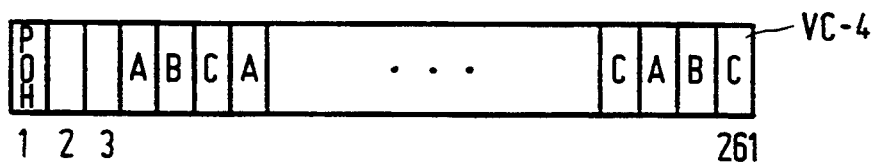

In the exemplary embodiment for an adaptation circuit 8 (FIG. 4) described with reference to FIG. 6, a justification operation for a VC-4 container has been discussed. Further thereto, a description will be given of an adaptation circuit that provides justification operations for VC-12 containers. In the drawing FIGS. 10a to 10d the nesting of the VC-12 containers in a VC-4 container is shown. FIG. 10a shows a VC-4 container carrying three TUG-3 containers. The first frame of the VC-4 container carries the POH. The frames 2 and 3 carry informationless bytes and the next frames alternately carry frames of three TUG-3 containers. For example, the fourth frame of the VC-4 container carries the first frame of the first TUG-3 container. the fifth frame carries the first frame of the second TUG-3 container and the sixth frame carries the first frame of the third TUG-3 container.

Figure 10B:
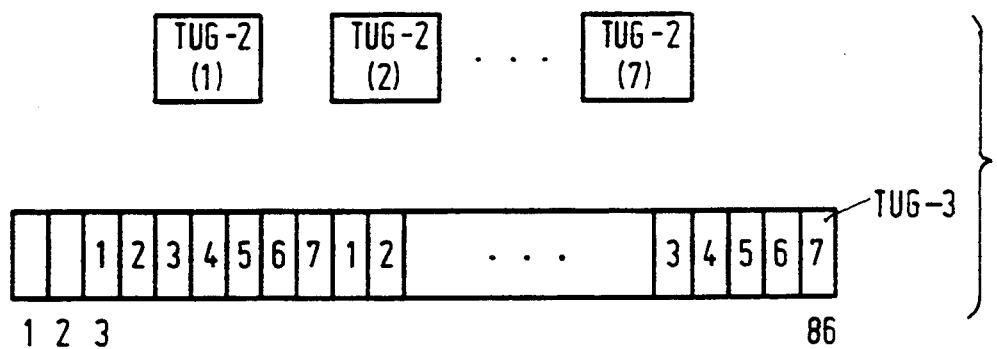
Figure 10C:
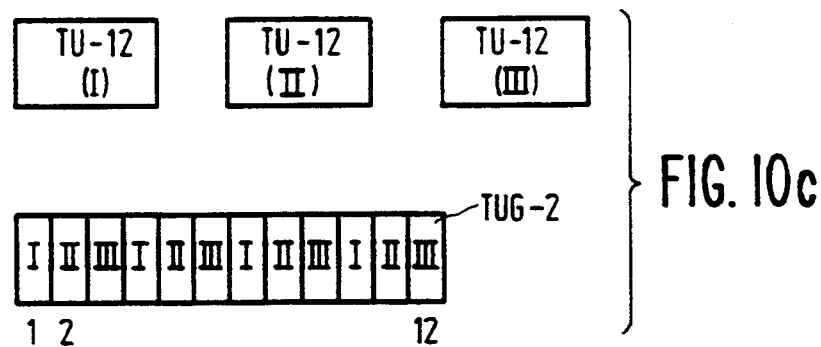
Figure 10D:
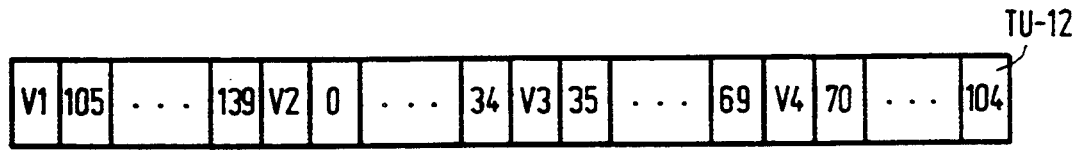

As shown in FIG. 10b, a TUG-3 container consists of seven nested TUG-2 containers. In the TUG-3 container the first two frames are filled with informationless bytes, and frames of the seven TUG-3 containers are alternately inserted into the subsequent frames. A TUG-2 container comprises three TU-12 containers. Frames of the three TU-12 containers are alternately inserted into the TUG-2 container. A TU-12 container, compared with a VC-12 container, is completed by additional pointer bytes. As shown in FIG. 10d, a TU-12 container comprises four sub-units of 36 bytes each, a sub-unit carrying a pointer byte and 35 further bytes. In an STM-1 frame first the first sub-unit is inserted, in the next frame the second sub-unit, in the third frame the third sub-unit and in the fourth frame the fourth sub-unit is inserted. A positive justification location in the TU-12 container is the location referenced 35. The negative justification location is the pointer byte V3. A VC-12 container starts with a byte referenced V5. This byte might be found, for example, at the location referenced "0".

Figure 11:
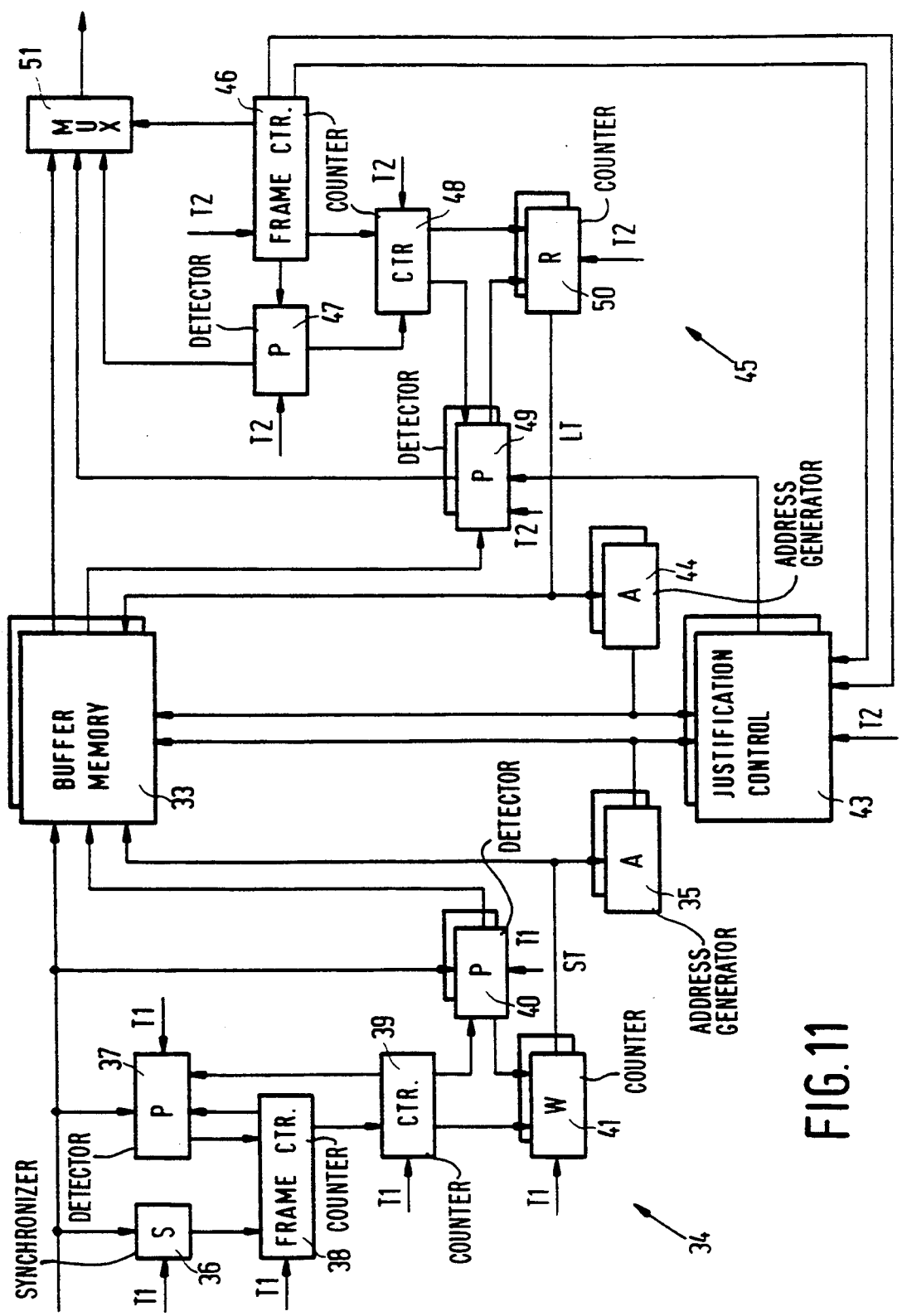
FIG. 11 shows a further exemplary embodiment of an adaptation circuit shown in FIG. 4.

The adaptation circuit 8, suitable for justifying VC-12 containers, is represented in FIG. 11. Since 63 VC-12 containers are accommodated in one VC-4 container, a buffer 33 is available to each VC-12 container. Each writing operation of each buffer 33 is controlled by way of an input circuit 34 and write address generator 35. The input circuit 34 comprises a second synchronizing circuit 36, a third detection circuit 37, a fifth frame counter 38, a sixth frame counter 39, 63 first bottom detection circuits 40 and 63 first bottom frame counters 41. All the circuits 36 to 41 in the input circuit 34 receive the input clock signal T1. In the second synchronizing circuit 36 the beginning of the frame is detected on the basis of a plurality of bytes at the beginning of an STM-1 frame. Then the fifth frame counter 38 is started by the second synchronizing circuit 36. In the third detection circuit 37 it is established by detection of the areas H1 and H2 where the starting point of the VC-4 container lies. For this purpose the third detection circuit 37 is informed of the position of the areas H1, H2 by the fifth frame counter 38. If a detection of the areas H1 and H2 shows that a negative or positive justification location is present, the fifth frame counter 38 is informed of this fact by the third detection circuit 37. The fifth frame counter 38 starts and stops the sixth frame counter 39. The sixth frame counter 39 produces a clock signal for the first bottom frame counter 41. The sixth frame counter 39 does not produce a clock signal until data of the VC-4 container are present. The sixth frame counter 39 further informs the first bottom detection circuits 40 of the position in time of the bytes V1 to V4 of the VC-12 container and the position in time of an H4 byte in the POH of the VC-4 container. The H4 byte denotes which of the bytes V1 to V4 is present and the pointer bytes V1 and V2 denote the position of the V5 byte in a VC-12 container. The first bottom detection circuits 40 inform the allocated first bottom frame counters 41 of the beginning of a VC-12 container. Furthermore, by detecting the pointer bytes V1 and V2 it is determined whether negative or positive justification locations are present in a VC-12 container. The beginning of a VC-12 container is identified in each allocated buffer 33 by a marker of the allocated first bottom detection circuit 40.

The first bottom frame counters 41 produce write clock signals ST for each allocated buffer 33 and each allocated write address generator 35. A payload is written in the buffer 33 under the write address generated by a write address generator 35. The write address output of each write address generator 35 is connected to justification decision circuits 43. Read address generators 44 generating read addresses for the reading operation from a buffer 33 are allocated to each buffer 33 and each justification decision circuit 43. The read address generators 44 are controlled by means of a read clock signal LT from an output circuit 45.

The output circuit 45 comprises a seventh frame counter 46, a fourth detection circuit 47, an eighth frame counter 48, 63 second bottom detection circuits 49 and 63 second bottom frame counters 50. Each one of these circuits in the output circuit 45 receives an output clock signal T2. The seventh frame counter 46 starts and stops the eighth frame counter which produces clock signals when data of the VC-4 container are to be read out. Furthermore, the seventh frame counter 46 denotes the position of the areas H1 and H2. The seventh frame counter 46 applies a frame clock signal and a stop signal also to the justification decision circuits 43. The justification decision circuits 43 are active for only one STM-1 frame and are stopped by the stop signal after 15 STM-1 frames.

The fourth detection circuit 47 applies the bytes of the areas H1 and H2 to a change-over switch 51 and denotes the beginning of a VC-4 container. The fourth detection circuit 47 informs the eighth frame counter 48 of the beginning of a VC-4 container, which container is always positioned at the same location because the TU-12 container only comprises justification locations.

The eighth frame counter 48 applies a clock signal to the second bottom frame counters 50 which produce the read clock signals ST for the read address generators 44. Furthermore, the eighth frame counter 48 informs the second bottom detection circuit 49 of the position in time of the pointer bytes V1 to V4. The justification decision circuits 43 represented in the FIGS. 7 to 9 apply the justification signal to the second bottom detection circuits 49. It should further be observed that the period of time taken by the averaging, i.e. the period of time of an accumulation, corresponds to the period of time of an STM-1 frame. The second bottom detection circuits 49 decide on the basis of the justification signals whether a negative or positive justification location is present in the TU-12 containers. Such a justification location is then announced to the second bottom frame counters 50 which then start producing a read clock signal LT at an earlier or later moment. The second bottom detection circuits 49 apply the pointer bytes V1 to V4 to the multiplexer or change-over switch 51. Furthermore, the multiplexer or change-over switch 51 receives the payloads or data respectively, from the buffers 33. The multiplexer or change-over switch 51 is controlled by means of the seventh frame counter 46.

Also in the exemplary embodiment of an adaptation circuit 8 as shown in FIG. 11 the circuit elements 36 to 41 of the input circuit 34 and the circuit elements 46 to 50 of the output circuit 45 comprise processor building blocks which execute a fixedly stored program.

In the following a diagrammatically outlined program routine is shown for each circuit element 36 to 41 and 46 to 50:

Second synchronizing circuit 36:
1. Determine the beginning of the STM-1 frame on the basis of data;
2. Set fifth frame counter 38 to starting position when beginning of frame has been recognized;

Fifth frame counter 38:
1. When counter is in starting position, set count to zero;
2. Increment count by unity;
3. When VC-4 data or a negative justification location (VC-4 container) are present, start sixth frame counter 39;
4. If no VC-4 data or a positive justification location (VC-4 container) are present, stop the sixth frame counter 39;
5. Inform the third evaluation circuit 37 of the beginning of the areas H1 and H2;

Third detection circuit 37:
1. If areas H1 and H2 are present, determine their contents;
2. Inform the fifth frame counter 38 of the fact whether a justification location and which location is present (VC-4 container);
3. Start counting operation until the beginning of the VC-4 container is reached;
4. Once the beginning of the VC-4 container has been reached, set fifth frame counter 38 to starting position;

Sixth frame counter 39:
1. When counter is in starting position, set count to zero;
2. When start of the fifth frame counter 38 has been released, increment count by unity; otherwise maintain old count;
3. Apply a clock signal to the first bottom frame counter 41 with each count increment;
4. Inform the first bottom detection circuits 40 of the position in time of the pointer bytes V1 to V4 of the VC-12 containers and of the byte H4 in the POH of the VC-4 container;
5. Inform the first bottom detection circuits 40 of the fact whether data of the allocated VC-12 container are present;

First bottom detection circuits 40:
1. Determine the contents of the pointer bytes V1 and V2;
2. Inform the allocated first bottom frame counters 41 of the beginning of a VC-12 container; set the count of the allocated first bottom frame counter 41 to starting position;
3. Once the beginning of a VC-12 container has been reached, marker to the allocated buffer 33;
4. If data of the allocated VC-12 container or a negative justification location are present, start the allocated first bottom frame counter 41;
5. If no data of the allocated VC-12 container or no positive justification location are present, stop the allocated first bottom frame counter 41;

First bottom frame counter 41:
1. When counter is in starting position, set count to zero;
2. If start of allocated first bottom detection circuit 40 has been released. increment count by unity, otherwise maintain old count;
3. Produce a clock of the write clock signal ST with each count increment;

Seventh frame counter 46:
1. Set count to zero at the beginning of an STM-1 frame;
2. Increment count by unity;
3. Set the eighth frame counter 48 to starting position at the beginning of the VC-4 frame and inform the fourth detection circuit 47 of this fact;
4. If data of the VC-4 container are present, start the eighth frame counter 48;
5. If no data of the VC-4 container are present, stop the eighth frame counter 48;
6. Inform the fourth detection circuit 44 of the beginning of the areas H1 and H2;
7. Connect output of a buffer 33 to the output of the change-over switch 51 if data of the allocated VC-12 container are present; Connect output of the fourth detection circuit 47 to the output of the change-over switch 51 if areas H1, H2 and H3 are present; Connect output of a second bottom detection circuit 49 to the output of the change-over switch 51 if the pointer bytes V1 to V4 and the area H4 are present;
8. Produce a frame clock and a row clock signal for the justification decision circuits 43;

Fourth detection circuit 47:
1. Form areas H1, H2 and H3 on the basis of the information of the seventh frame counter 46 about the beginning of the VC-4 frame;

Eighth frame counter 65:
1. When counter is in starting position, set count to zero;
2. When start of the seventh frame counter 46 has been released, increment count by unity; otherwise maintain old count;

3. Apply a clock of the clock signal to the second bottom frame counter 50 with each count increment;
4. Inform the second bottom detection circuits 49 of the position in time of the pointer bytes V1 to V4 of the VC-12 container and of the byte H4 in the POH of the VC-4 container;
5. Inform the second bottom detection circuits 49 of the fact whether data of the allocated VC-12 container are present;

Second bottom detection circuits 49:
1. Form the contents of the pointer bytes V1 to V4 and also a positive justification location on the basis of the marker from the allocated buffer 33 and the justification decision from the allocated justification decision circuit 43;
2. Inform the allocated second bottom frame counter 50 of the marker;
3. If data of the allocated VC-12 container are to be read out or a negative justification location is present, start the allocated second bottom frame counter 50;
4. If no data of the allocated VC-12 container are to be read out, or a positive justification location is present, stop the allocated second bottom frame counter 50;

Second bottom frame counter 50:
1. If marker is present (counter starting position), set count to zero;
2. When start of second bottom detection circuit 49 has been released, increment count by unity; otherwise maintain old count;
3. Produce a clock of the read clock signal ST with each count increment.

It should further be observed that a plurality of lines have partly been represented as one line for clarity.

I claim:

1. An apparatus for transmitting synchronous digital data in a Synchronous Transport Module (STM-N) format in which said data are grouped in containers, wherein said containers include at least a first plurality of said containers each having a respective positive justification location at a predetermined positive location or a respective negative justification location at a predetermined negative location, comprising means for receiving an STM-N signal containing said data in one of said first plurality of containers, means for receiving an output clock signal, and an adaptation circuit for compensating for phase variations of said STM-N signal with respect to said output clock signal,
characterized in that said adaptation circuit comprises:
detecting means for determining whether said one of said first plurality of containers has a positive or has a negative justification location at the corresponding location,
a buffer for storing portions of said data of said one of said first plurality of containers at a plurality of addresses,
a write address generator, connected to said buffer and synchronized to the received STM-N signal, for forming write addresses at which respective portions of said data of said one of said first plurality of containers are written in said buffer,
a read address generator, connected to said buffer and synchronized to said output clock signal, for forming read addresses at which respective portions of said data of said one of said first plurality of containers are read from said buffer,
a justification decision circuit, including means for determining differences between said write addresses and said read addresses over a given period of time, and means for determining the mean value of said differences; said justification decision circuit providing a justification signal responsive to said mean value, said justification signal being indicative of whether or not positive or negative justification is required, and
an output circuit for receiving said respective portions read from said buffer, and for providing an output signal based on said respective portions; responsive to said justification signal being a positive justification signal and said detecting means determining that said first plurality of containers has a positive justification location, for filling said positive location in the one container with at least one justification byte; and, responsive to said justification signal being a negative justification signal and said detecting means determining that said one of said first plurality of containers has a negative justification location, for filling said negative location in the one container with at least a part of one of said respective portions read from said buffer.

2. An apparatus as claimed in claim 1, wherein said containers include a second plurality of containers, said second plurality including said first plurality, comprising a corresponding second plurality of said buffers, said write address generators, said read address generators, and said justification decision circuits, the number of said corresponding second plurality being equal to the number of said second plurality of containers.

3. An apparatus as claimed in claim 1, characterized in that said means for determining the mean value comprises means for accumulating said difference values over said given period of time, and
said justification decision circuit further comprises means for comparing said mean value with a predetermined lower peak value and a predetermined upper peak value, and
means for producing said negative justification signal if said mean value is less than said lower peak value, and for producing said positive justification signal if said mean value is greater than said upper peak value.

4. An apparatus as claimed in claim 3, characterized in that said means for accumulating accumulates values of a periodic or of a random number sequence together with said difference values.

5. An apparatus as claimed in claim 1, characterized in that
said write address generator comprises a write counter,
said means for receiving an STM-N signal includes means for recovering an input clock signal from said STM-N signal, and for providing said input clock signal to said write counter only if data are present for said one of said first plurality of containers.

6. An apparatus as claimed in claim 1, characterized in that
said apparatus further comprises an oscillator producing said output clock signal,
said read address generator comprises a read counter, and said means for receiving an output clock signal receives said output clock signal from said oscillator, and, for synchronizing said read address generator to said output clock signal, provides read clock pulses to said read counter only for reading said data in said one of said first plurality of containers.

7. An apparatus as claimed in claim 6, characterized in that said means for receiving an output clock signal is controlled to provide an additional read clock pulse to said read counter responsive to a negative justification signal, and to interrupt said read clock pulses responsive to a positive justification signal.

8. An apparatus for transmitting synchronous digital data in a Synchronous Transport Module (STM-N) format in which said data are grouped in containers, wherein said containers include at least a first plurality of said containers each having a respective positive justification location at a predetermined positive location or a respective negative justification location at a predetermined negative location, comprising means for receiving an STM-N signal containing said data in one of said first plurality of containers, means for receiving an output clock signal, and an adaptation circuit for compensating for phase variations of said STM-N signal with respect to said output clock signal, characterized in that said adaptation circuit comprises:
detecting means for determining whether said one of said first plurality of containers has a positive or has a negative justification location at the corresponding locations
a buffer for storing portions of said data of said one of said first plurality of containers at a plurality of addresses,
a write address generator, connected to said buffer and synchronized to the received STM-N signal, for forming write addresses at which respective portions of said data of said one of said first plurality of containers are written in said buffer,
a read address generator, connected to said buffer and synchronized to said output clock signal, for forming read addresses at which respective portions of said data of said one of said first plurality of containers are read from said buffer,
a justification decision circuit, including
means for determining differences between said write addresses and said read addresses over a given period of time,
means for setting the difference value between said write address and said read address equal to zero when said buffer is half full,
means, including means for accumulating the difference values over said given period of timer for determining the mean value of said differences,
means for providing a justification signal responsive to said mean value, said justification signal being indicative of whether or not positive or negative justification is required, and
means for multiplying justification signals by a constant factor, and
an output circuit for receiving said respective read from said buffer, and for providing an output signal based on said respective portions,
wherein, responsive to said justification signal being a positive justification signal and said detecting means determining that said one of said first plurality of containers has a positive justification location, said output circuit fills said positive location in the one container with at least one justification byte; and, responsive to said justification signal being a negative justification signal and said detecting means determining that said one of said first plurality of containers has a negative justification location, said output circuit fills said negative location in the one container with at least a part of one of said respective portions read from said buffer, and
said means for accumulating accumulates at least one multiplied value and a difference value.

9. An apparatus as claimed in claim 8, characterized in that said means for accumulating accumulates values of a periodic or of a random number sequence together with said difference values.

10. An apparatus as claimed in claim 9, characterized in that
said write address generator comprises a write counter,
said means for receiving an STM-N signal includes means for recovering an input clock signal from said STM-N signal, and for providing said input clock signal to said write counter only if data are present for said one of said first plurality of containers.

11. An apparatus as claimed in claim 8, characterized in that
said write address generator comprises a write counter,
said means for receiving an STM-N signal includes means for recovering an input clock signal from said STM-N signal, and for providing said input clock signal to said write counter only if data are present for said one of said first plurality of containers.

12. An apparatus as claimed in claim 8, characterized in that
said apparatus further comprises an oscillator producing said output clock signal,
said read address generator comprises a read counter, and
said means for receiving an output clock signal receives said output clock signal from said oscillator, and, for synchronizing said read address generator to said output clock signal, provides read clock pulses to said read counter only for reading said data in said one of said first plurality of containers.

13. An apparatus as claimed in claim 12, characterized in that said means for receiving an output clock signal is controlled to provide an additional read clock pulse to said read counter responsive to a negative justification signal, and to interrupt said read clock pulses responsive to a positive justification signal.

14. An apparatus as claimed in claim 13, characterized in that said means for accumulating accumulates values of a periodic or of a random number sequence together with said difference values.

15. An apparatus as claimed in claim 12, characterized in that said means for accumulating accumulates values of a periodic or of a random number sequence together with said difference values.

16. An apparatus for transmitting synchronous digital data in a Synchronous Transport Module (STM-N) format in which said data are grouped in frames, each frame comprising at least one container, and each container comprising at least one row, wherein said containers in said frames include at least a first plurality of said containers each having a respective positive justification location at a predetermined positive location or a respective negative justification location at a predetermined negative location, comprising means for receiving an STM-N signal containing said data in one of said first plurality of containers, means for receiving an output clock signal, and an adaptation circuit for compensating for phase variations of said STM-N signal with respect to said output clock signal, characterized in that said adaptation circuit comprises:

detecting means for determining whether said one of said first plurality of containers has a positive or has a negative justification location at the corresponding location, a buffer for storing portions of said data of said one of said first plurality of containers at a plurality of addresses, a write address generator, connected to said buffer and synchronized to the received STM-N signal, for forming write addresses at which respective portions of said data of said one of said first plurality of containers are written in said buffer, a read address generator, connected to said buffer and synchronized to said output clock signal, for forming read addresses at which respective portions of said data of said one of said first plurality of containers are read from said buffer, a justification decision circuit, including means for determining differences between said write addresses and said read addresses over a given period of time corresponding to one row or frame period or a multiple thereof, and means for determining the mean value of said differences; said justification decision circuit providing a justification signal responsive to said mean value, said justification signal being indicative of whether or not positive or negative justification is required, and an output circuit for receiving said respective portions read from said buffer, and for providing an output signal based on said respective portions; responsive to said justification signal being a positive justification signal and said detecting means determining that said one of said first plurality of containers has a positive justification location, for filling said positive location in the one container with at least one justification byte; and, responsive to said justification signal being a negative justification signal and said detecting means determining that said one of said first plurality of containers has a negative justification location, for filling said negative location in the one container with at least a part of one of said respective portions read from said buffer.

17. An apparatus as claimed in claim 16, characterized in that said means for accumulating accumulates values of a periodic or of a random number sequence together with said difference values.

18. An apparatus as claimed in claim 17, characterized in that said write address generator comprises a write counter, said means for receiving an STM-N signal includes means for recovering an input clock signal from said STM-N signal, and for providing said input clock signal to said write counter only if data are present for said one of said first plurality of containers.

19. An apparatus as claimed in claim 16, characterized in that said write address generator comprises a write counter, said means for receiving an STM-N signal includes means for recovering an input clock signal from said STM-N signal, and for providing said input clock signal to said write counter only if data are present for said one of said first plurality of containers.

20. An apparatus as claimed in claim 16, characterized in that said apparatus further comprises an oscillator producing said output clock signal, said read address generator comprises a read counter, and said means for receiving an output clock signal receives said output clock signal from said oscillator and, for synchronizing said read address generator to said output clock signal, provides read clock pulses to said read counter only for reading said data in said one of said first plurality of containers; and, responsive to a negative justification signal, provides an additional read clock pulse to said read counter, and, responsive to a positive justification signal, interrupts said read clock pulses.

* * * * *